United States Patent
McShane et al.

(10) Patent No.: US 11,570,189 B2
(45) Date of Patent: Jan. 31, 2023

(54) SIMULTANEOUSLY TESTING WHETHER A PLURALITY OF ELECTRONIC DEVICES CONNECTED VIA A COMMUNICATION NETWORK CORRECTLY HANDLE EXCEPTIONS

(71) Applicant: Robert Bosch GmbH, Stuttgart (DE)

(72) Inventors: John McShane, Waterford, MI (US); Timothy S. Arntson, Ypsilanti, MI (US); Lena Jokanovic, Belgrade (RS); Frederic W. Brosch, Bochum (DE); Norbert M. Fabritius, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 16/706,193

(22) Filed: Dec. 6, 2019

(65) Prior Publication Data
US 2020/0186558 A1 Jun. 11, 2020

Related U.S. Application Data

(60) Provisional application No. 62/776,581, filed on Dec. 7, 2018.

(51) Int. Cl.
*H04L 29/06* (2006.01)
*H04L 9/40* (2022.01)
(Continued)

(52) U.S. Cl.
CPC ......... *H04L 63/1425* (2013.01); *G06N 5/048* (2013.01); *G07C 5/0816* (2013.01);
(Continued)

(58) Field of Classification Search
CPC ..... H04L 63/1425; H04L 12/40; G06N 5/048; G07C 5/0816
See application file for complete search history.

(56) References Cited

U.S. PATENT DOCUMENTS 7,987,002 B2 7/2011 Fredriksson
8,676,437 B2 3/2014 Yamada
(Continued)

FOREIGN PATENT DOCUMENTS

JP 2001051865 A 2/2001
JP 2013196390 A 9/2013
(Continued)

OTHER PUBLICATIONS

Fowler et al., "Fuzz Testing for Automotive Cyber-Security", IEEE/IFIP International Conference on Dependable Systems and Networks Workshops, Jun. 2018, pp. 239-246.
(Continued)

*Primary Examiner* — Jeffrey C Pwu
*Assistant Examiner* — Thong P Truong
(74) *Attorney, Agent, or Firm* — Michael Best & Friedrich LLP

(57) ABSTRACT

A system for simultaneously testing whether a plurality of electronic devices connected via a communication network correctly handle exceptions. The system includes a communication network, and a plurality of electronic devices and a testing device connected via the communication network. The testing device includes an electronic processor. The electronic processor is configured to send a first status query message to the plurality of electronic devices, send fuzzed data to one or more of the plurality of electronic devices, and send a second status query message to the plurality of the electronic devices. The electronic processor is also configured to, for each electronic device that responds to the first status query message with a valid response and responds to the second status query message with an invalid response or fails to respond to the second status query message, record the electronic device in a failure log.

16 Claims, 9 Drawing Sheets

(51) Int. Cl.
   *G06N 5/04* (2006.01)
   *G07C 5/08* (2006.01)
   *H04L 12/40* (2006.01)
(52) U.S. Cl.
   CPC .... *H04L 12/40* (2013.01); *H04L 2012/40215* (2013.01); *H04L 2012/40273* (2013.01)

(56) References Cited

U.S. PATENT DOCUMENTS

| | | | |
|---|---|---|---|
| 8,676,958 | B1 | 3/2014 | Hendon et al. |
| 10,013,828 | B2 | 7/2018 | Link |
| 10,055,904 | B2 | 8/2018 | Miller et al. |
| 2009/0281779 | A1* | 11/2009 | Kajitani ................ G05B 17/02 703/7 |
| 2013/0114647 | A1 | 5/2013 | Koike |
| 2018/0234446 | A1 | 8/2018 | Conner et al. |
| 2019/0141074 | A1 | 5/2019 | Oka |

FOREIGN PATENT DOCUMENTS

| | | |
|---|---|---|
| JP | 2016032274 A | 3/2016 |
| JP | 2018098707 A | 6/2018 |
| KR | 20180109642 A | 10/2018 |
| WO | 2008075827 A1 | 6/2008 |
| WO | 2017203375 A1 | 11/2017 |

OTHER PUBLICATIONS

International Search Report and Written Opinion for Application No. PCT/IB2019/001312 dated Apr. 20, 2020 (17 pages).

International Preliminary Report on Patentability for Application No. PCT/IB2019/001312 dated Jun. 8, 2021 (9 pages).

Machine translation of Japanese Patent Office Notice of Reasons for Refusal for Application No. 2021-532083 dated Apr. 25, 2022 (6 pages).

* cited by examiner

STATUS QUERY MESSAGE SENT IN
SYSTEM 100

STATUS QUERY MESSAGE SENT IN
PREVIOUS SYSTEMS

SIMULTANEOUSLY TESTING WHETHER A PLURALITY OF ELECTRONIC DEVICES CONNECTED VIA A COMMUNICATION NETWORK CORRECTLY HANDLE EXCEPTIONS

RELATED APPLICATIONS

This application claims priority to U.S. Provisional Patent Application No. 62/776,581, filed Dec. 7, 2018, the entire content of which is hereby incorporated by reference.

BACKGROUND

It is important for software developers to test that electronic devices connected via a communication network correctly handle exceptions that are thrown in response to receiving corrupt data. Incorrect handling of an exception may cause an electronic device to become unresponsive, allow unauthorized access to the electronic device, or have other undesirable consequences. An example of electronic devices connected via a communication network is a plurality of electronic devices included in a vehicle that are connected by, for example, a control area network (CAN) bus. In existing systems, a user testing devices connected via a communication network included in a vehicle has to test each electronic device separately.

SUMMARY

Using existing systems to test the electronic devices connected via a communication network is an inefficient use of time and an inefficient use of computing resources because each device is tested separately. Additionally, simultaneously testing multiple electronic devices mimics a real world situation where electronic devices are constantly communicating via a communication network (for example, a bus) with a heavy load and latency. Testing electronic devices individually lowers the chances of finding issues caused, at least in part, by an increased load or latency in the communication network. Embodiments described herein provide a system and method for simultaneously testing whether a plurality of electronic devices connected via a communication network correctly handle exceptions.

One embodiment provides a system for simultaneously testing whether a plurality of electronic devices connected via a communication network correctly handle exceptions. The system includes a communication network, and a plurality of electronic devices and a testing device connected via the communication network. The testing device includes an electronic processor. The electronic processor is configured to send a first status query message to the plurality of electronic devices, via the communication network, send fuzzed data to one or more of the plurality of electronic devices, via the communication network, and send a second status query message to the plurality of the electronic devices, via the communication network. The electronic processor is also configured to, for each electronic device that responds to the first status query message with a valid response and responds to the second status query message with an invalid response or fails to respond to the second status query message, record the electronic device in a failure log.

Another embodiment provides a method of simultaneously testing whether a plurality of electronic devices connected via a communication network correctly handle exceptions. The method includes sending, with an electronic processor, a first status query message to the plurality of electronic devices via the communication network, sending, with the electronic processor, fuzzed data to one or more of the plurality of electronic devices, via the communication network, and sending, with the electronic processor, a second status query message to the plurality of the electronic devices, via the communication network. The method also includes, for each electronic device that responds to the first status query message with a valid response and responds to the second status query message with an invalid response or fails to respond to the second status query message, recording the electronic device in a failure log.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

Figure 1:
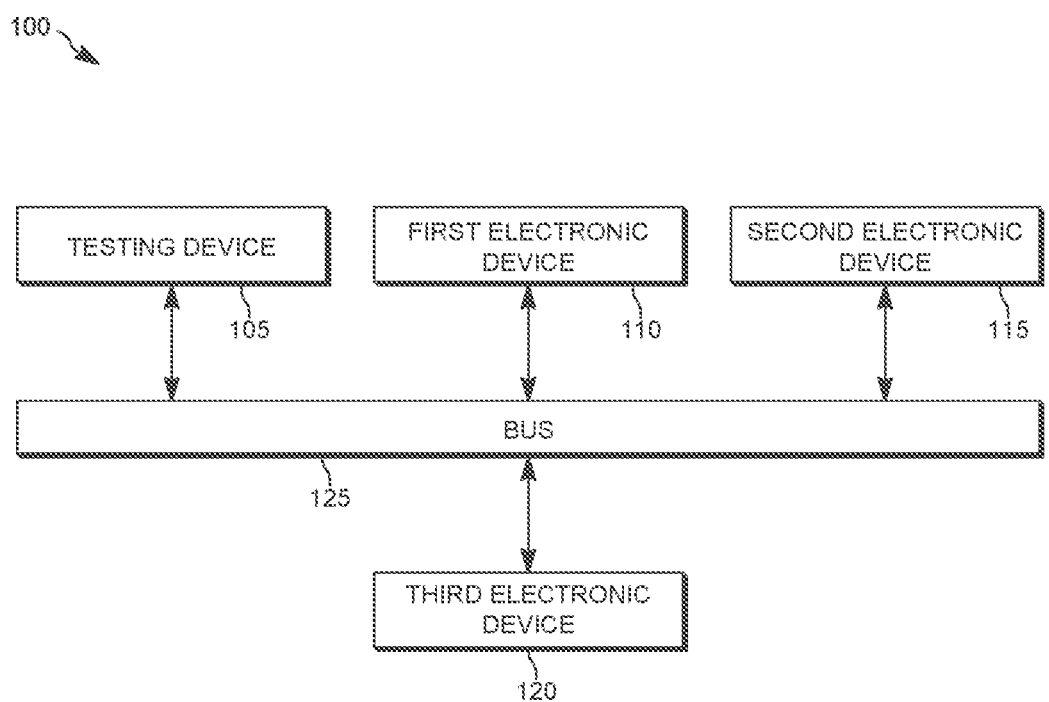
FIG. 1 is a block diagram of a system for simultaneously testing a plurality of electronic devices connected via a communication network according to one embodiment.

FIG. 1 illustrates a system 100 for simultaneously testing whether a plurality of electronic devices connected via a communication network correctly handle exceptions. In the example illustrated, the system 100 includes a testing device 105 (which is an electronic device), a first electronic device 110, a second electronic device 115, and a third electronic device 120 (referred to collectively herein as electronic devices 110, 115, 120) connected via a communication network 125. While the communication network 125 is illustrated herein as a bus (for example a CAN bus), the communication network 125 may be implemented using other network protocols and other network modalities including, for example a wide area network, such as the Internet, a local area network, such as a Wi-Fi network, short-range wireless networks, such as a Bluetooth™ network, near field communication connections, and combinations or derivatives thereof. The embodiment illustrated in FIG. 1 provides but one example of the components and connections of the system 100. In other embodiments, these components and connections may be constructed in other ways than those illustrated and described herein. For example, the system 100 may include a different number of electronic devices than the four electronic devices illustrated in FIG. 1.

Figure 2A:
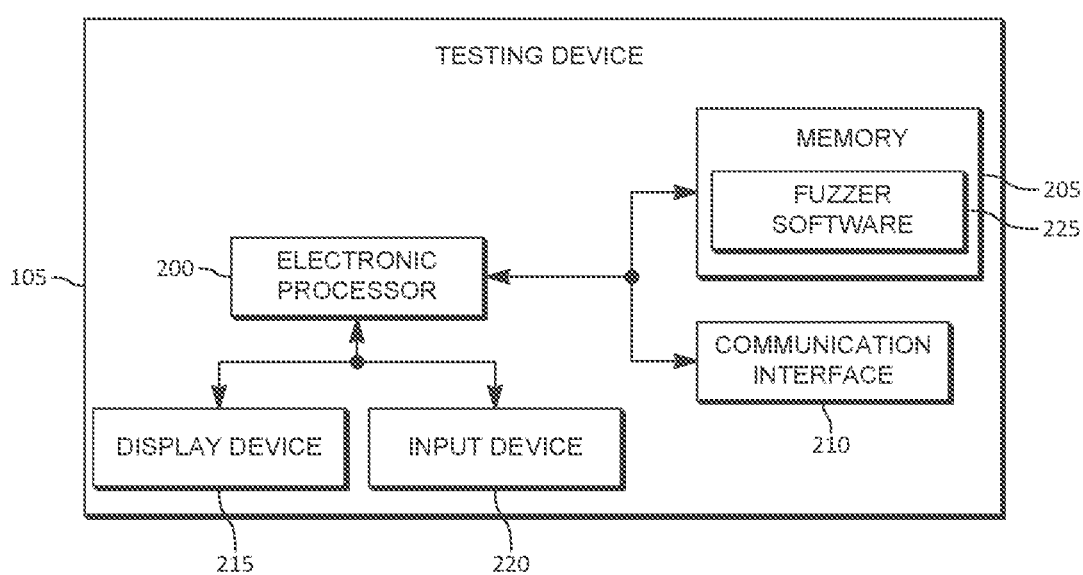
FIG. 2A is a block diagram of the testing device of the system of FIG. 1 according to one embodiment.

FIG. 2A is a block diagram of an example of the testing device 105 of the system 100 of FIG. 1. The testing device 105 includes a plurality of electrical and electronic components that provide power, operation control, and protection to the components and modules within the testing device 105. The testing device 105 includes, among other things, an electronic processor 200 (such as a programmable electronic microprocessor, microcontroller, or similar device), a memory 205 (for example, non-transitory, computer or machine readable memory), a communication interface 210, a display device 215, and an input device 220. The display device 215 may be, for example, a touchscreen, a liquid crystal display ("LCD"), a light-emitting diode ("LED") display, an organic LED ("OLED") display, an electroluminescent display ("ELD"), and the like. The input device 220 may be, for example, a keypad, a mouse, a touchscreen (for example, as part of the display device 215), a microphone, a camera, or the like. The electronic processor 200 is communicatively connected to the memory 205, communication interface 210, display device 215, and input device 220. The electronic processor 200, in coordination with the memory 205 and the communication interface 210, is configured to implement, among other things, the methods described herein. For example, the electronic processor 200 may execute fuzzer software 225, included in the memory 205, to create fuzzed data. The testing device 105 may contain sub-modules that include additional electronic processors, memory, or application specific integrated circuits (ASICs) for handling communication functions, processing of signals, and application of the methods listed below. In some embodiments, the testing device 105 includes additional, fewer, or different components. In some embodiments, the functionality described as being performed by the testing device 105 may be distributed amongst multiple devices.

Figure 2B:
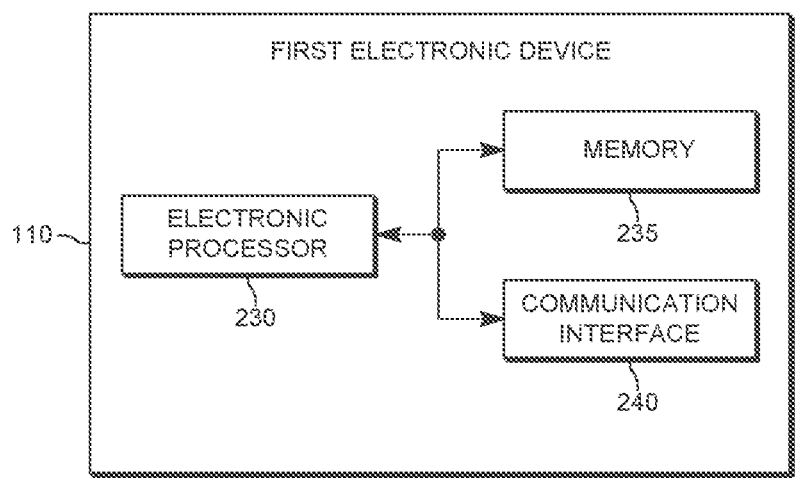
FIG. 2B is a block diagram of a first electronic device of the system of FIG. 1 according to one embodiment.

FIG. 2B is a block diagram of the first electronic device 110 of the system 100 of FIG. 1. The first electronic device 110 includes a plurality of electrical and electronic components that provide power, operation control, and protection to the components and modules within the first electronic device 110. The first electronic device 110 includes, among other things, an electronic processor 230 (such as a programmable electronic microprocessor, microcontroller, or similar device), a memory 235 (for example, non-transitory, computer or machine readable memory), and a communication interface 240. The electronic processor 230 is communicatively connected to the memory 235 and the communication interface 240. The electronic processor 230, in coordination with the memory 235 and the communication interface 240, is configured to implement, among other things, the methods described herein. The first electronic device 110 may contain sub-modules that include additional electronic processors, memory, or application specific integrated circuits (ASICs) for handling communication functions, processing of signals, and application of the methods listed below. In some embodiments, the first electronic device 110 includes additional, fewer, or different components. Although not illustrated herein it should be noted that the second electronic device 115 and third electronic device 120 include components and connections similar to those illustrated in FIG. 2B as being included in the first electronic device 110. Additionally, the second electronic device 115 and third electronic device 120 perform functionality similar to the functionality described herein as being performed by the first electronic device 110.

Figure 3:
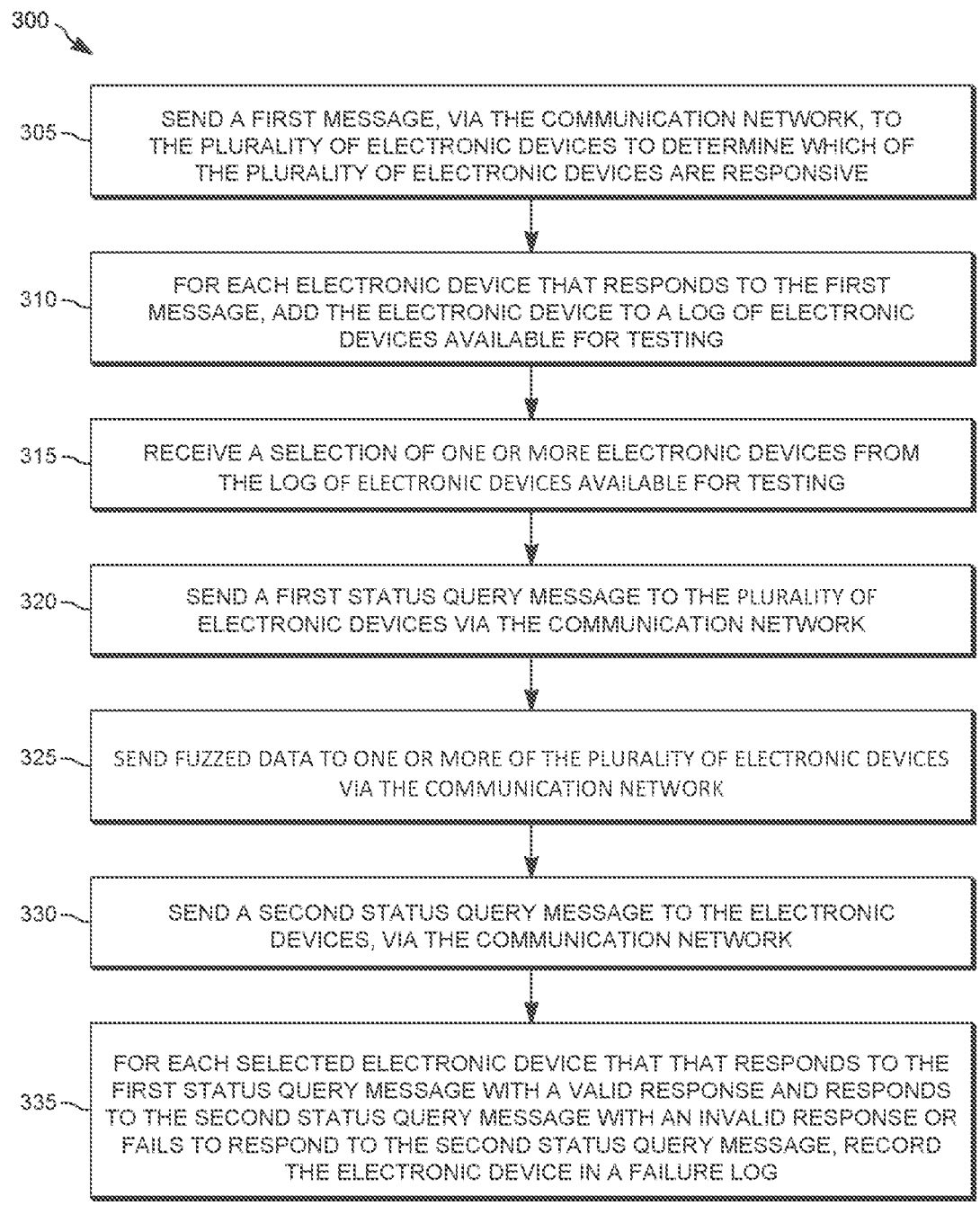
FIG. 3 is a flowchart of a method of using the system of FIG. 1 to simultaneously test a plurality of electronic devices connected via a communication network according to one embodiment.
Figure 4:
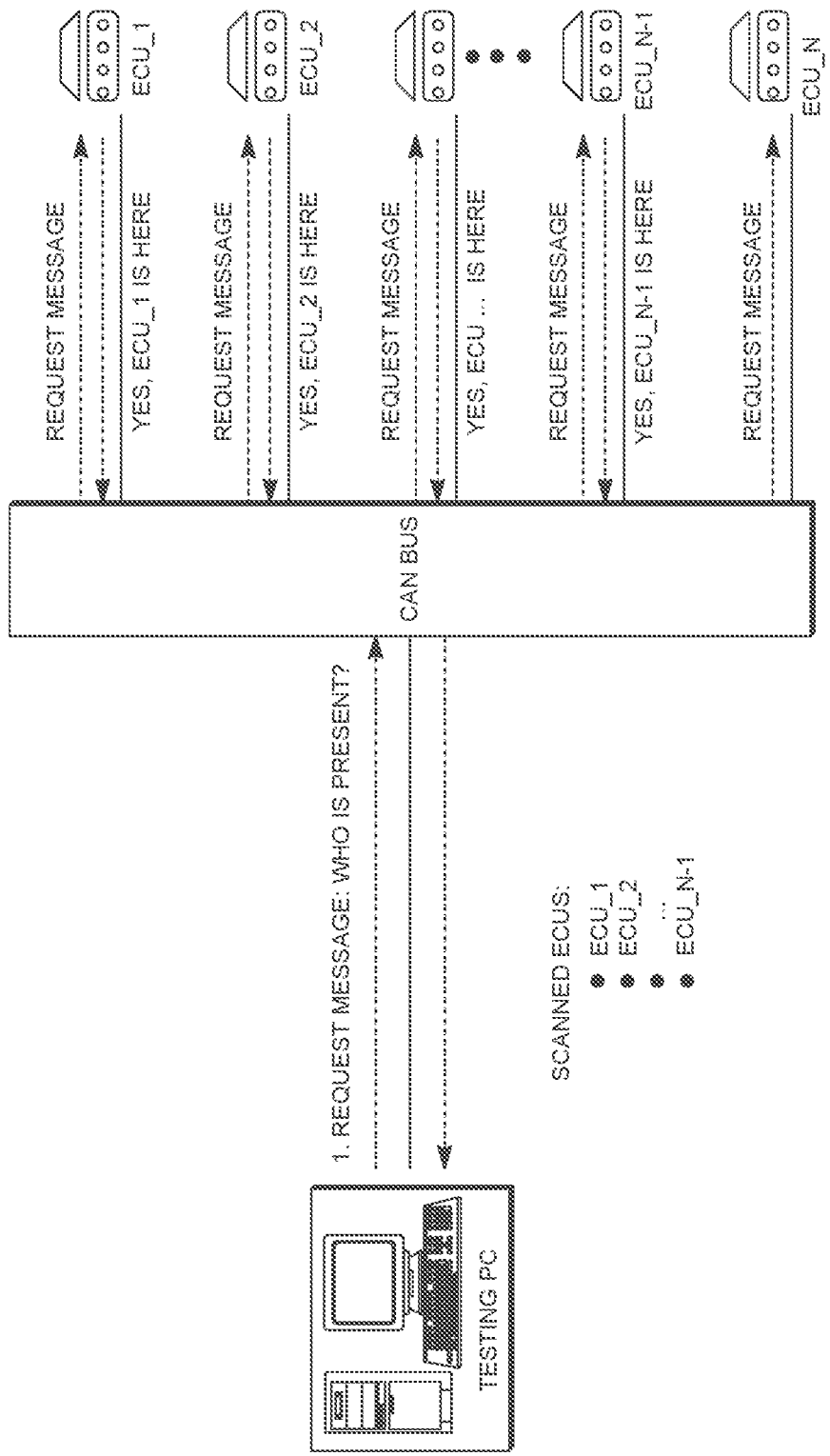
FIG. 4 is an illustrative example of steps 305 and 310 of the method of FIG. 3.

FIG. 3 is a flow chart illustrating an example method 300 of simultaneously testing whether a plurality of electronic devices (for example, the first electronic device 110, second electronic device 115, and third electronic device 120) connected via a communication network (for example, the communication network 125) correctly handle exceptions. In some embodiments, the method 300 begins when, in step 305, the electronic processor 200 sends a first message, via the communication network 125, to a plurality of electronic devices to determine which of the electronic devices are responsive. For example, in the system 100, the electronic processor 200 sends the first message to the first electronic device 110, the second electronic device 115, and the third electronic device 120. As will be described in further detail below, the header of the first message includes a global identifier. Assuming the electronic devices 110, 115, 120 and communication network 125 are functioning properly, each of the electronic devices 110, 115, 120 receive the first message and send a response message to the electronic processor 200 confirming that they are connected to the communication network 125. FIG. 4 provides a graphical example of step 305. In the example embodiment illustrated in FIG. 4, a personal computer sends the first message to a plurality of electronic control units (ECUs) connected by a CAN bus.

In step 310, the electronic processor 200 creates a record or log of each electronic device it receives a response to the first message from. For example, the electronic processor 200 may record a unique identifier for each electronic device that replies to the first message. It should be noted that, when an electronic device is described herein as being included or recorded in a log or a record, it is a unique identifier of the electronic device that is recorded in the log. The log of replies is a log of electronic devices available for testing.

The electronic processor 200 may display, to a user via the display device 215, the log of electronic devices available for testing so that the user may select the particular electronic devices the user wishes to test. In step 315, the electronic processor 200 receives a selection of one or more electronic devices to test or a selection confirming that each electronic device of the plurality of electronic devices available for testing should be tested.

In step 320, the electronic processor 200 sends a first status query message to each electronic device connected to the communication network 125 (for example, the electronic devices 110, 115, 120). The first status query message inquires whether the electronic devices are operating correctly. As will be described in further detail below, the header of the first status query message includes a global identifier. Although the first status query message is sent to each of the electronic devices connected to the communication network 125, the electronic processor 200 only records, in a log of responses to the first status query, valid responses that it receives from the selected electronic devices. For example, the electronic processor 200 may record a unique identifier for each electronic device that replies to the first status query message with a valid response. In some instances, not all of the selected electronic devices respond. Therefore, the record or log of responses to the first status query created by the electronic processor 200 provides an indication of or helps affirm which of the selected electronic devices are operating correctly. In some embodiments, the method 300 starts at step 320 rather than step 305 and the electronic processor 200 records, in the log of responses to the first status query, each of electronic devices the electronic processor 200 receives valid responses to the first status query message from. In step 325, the electronic processor 200 sends a message with fuzzed data to one or more of the plurality of electronic devices (for example, each of the plurality of the electronic devices or each of the selected electronic devices). In general, fuzzed data includes random, purposely corrupt, or large amounts of data designed to cause an electronic device to malfunction. For example, fuzzed data may include data of an improper type or size which when received by an electronic device causes the electronic device to perform an operation that results in the electronic device (more specifically, an electronic processor of the electronic device) throwing an exception. If computer executable instructions stored in a memory of the electronic device include instructions for handling the exception, the electronic device will continue to operate normally after throwing the exception. Otherwise, the electronic device will malfunction after throwing the exception by, for example, becoming unresponsive.

In some embodiments, the electronic processor 200 receives a file, for example, an ARXML (Autosar XML) file and parses the ARXML file to create messages with fuzzed data, using the fuzzer software 225. By parsing the ARXML file, the electronic processor 200 determines valid messages the electronic devices 110, 115, 120 are configured to receive. To create fuzzed data, the electronic processor 200 may alter the data length field of a valid message, arbitration ID of a valid message, length of a valid message, the payload of a valid message, and the like. Altering valid messages slightly rather than creating a message including random data increases the likelihood that the electronic processor 200 creates a message that, when received by an electronic device, causes the electronic device to throw an exception.

In step 330, the electronic processor 200 sends a second status query message to the electronic devices. As will be described in further detail below, the header of the second status query message includes a global identifier. The electronic processor 200 records, in a log of responses to the second query message, each electronic device that replies to the second status query message with a valid response. For example, the electronic processor 200 may record a unique identifier for each electronic device that replies to the second status query message with a valid response. It should be noted that, in some cases where a selection of electronic devices is received by the electronic processor 200, only the selected devices that reply to the second status query message with a valid response are recorded in the log of responses to the second query message. The log of responses to the second query message provides an indication of which electronic devices are operating properly after receiving the fuzzed data. As should be apparent, unique identifiers of electronic devices that do not reply to the second status query message or do not reply to the second query message with a valid response are not recorded by the electronic processor 200. A predetermined amount of time after the second status query message is sent to the electronic devices, the electronic processor 200 compares the unique identifiers of electronic devices that responded to the first status query message with a valid response to the unique identifiers of electronic devices that responded to the second status query message with a valid response. By this comparison, the electronic processor 200 determines if one or more of the selected electronic devices did not handle an exception correctly. In step 335, the electronic processor 200 records the electronic devices that did not handle an exception correctly (electronic devices that respond to the first status query message with a valid response and respond to the second status query message with an invalid response or fail to respond to the second status query message) in a failure log.

In some embodiments, after a predetermined amount of time, the electronic processor 200 sends a third status query message to each electronic device recorded in the failure log. In some embodiments, when an electronic device recorded in the failure log does not respond to the third status query message or replies with an invalid response, the electronic processor 200 sends an alert to a mobile device or displays, via the display device 215, an option to power cycle the malfunctioning electronic device. In response to receiving, from the input device 220 or the mobile device, a selection of the option to power cycle the malfunctioning electronic device, the electronic processor 200 sends a message to the malfunctioning electronic device to power cycle the malfunctioning electronic device. In other embodiments, when an electronic device recorded in the failure log does not respond to the third status query message or replies with an invalid response, the electronic processor 200 automatically sends a message to the malfunctioning electronic device to power cycle the malfunctioning electronic device. In some embodiments, the electronic processor 200 receives new or revised computer executable instructions and sends the new or revised computer executable instructions to an electronic device recorded in the failure log. The new or revised computer executable instructions replace computer executable instructions that were previously stored in the memory of the electronic device. The new computer executable instructions are designed to prevent the electronic device from malfunctioning when, in the future, the electronic device receives data similar to the fuzzed data which caused it to be recorded in the failure log.

Figure 5:
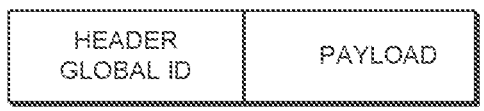
FIG. 5 is an illustrative example of a status query message sent by the testing device in steps 320 and 330 of the method of FIG. 3 according to one embodiment.
Figure 5:
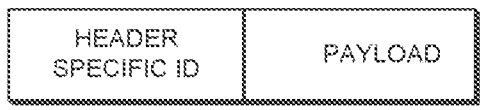

FIG. 5 illustrates an example of a status query message that the electronic processor 200 sends to the electronic devices. Unlike status query messages of previous systems, which include, in the header of the status query message, a device identifier unique to a single electronic device, the header of a status query message sent by the system 100 includes a global identifier which queries every electronic device connected to the communication network 125. The header of the first message and second query message will also include a global identifier.

Figure 6:
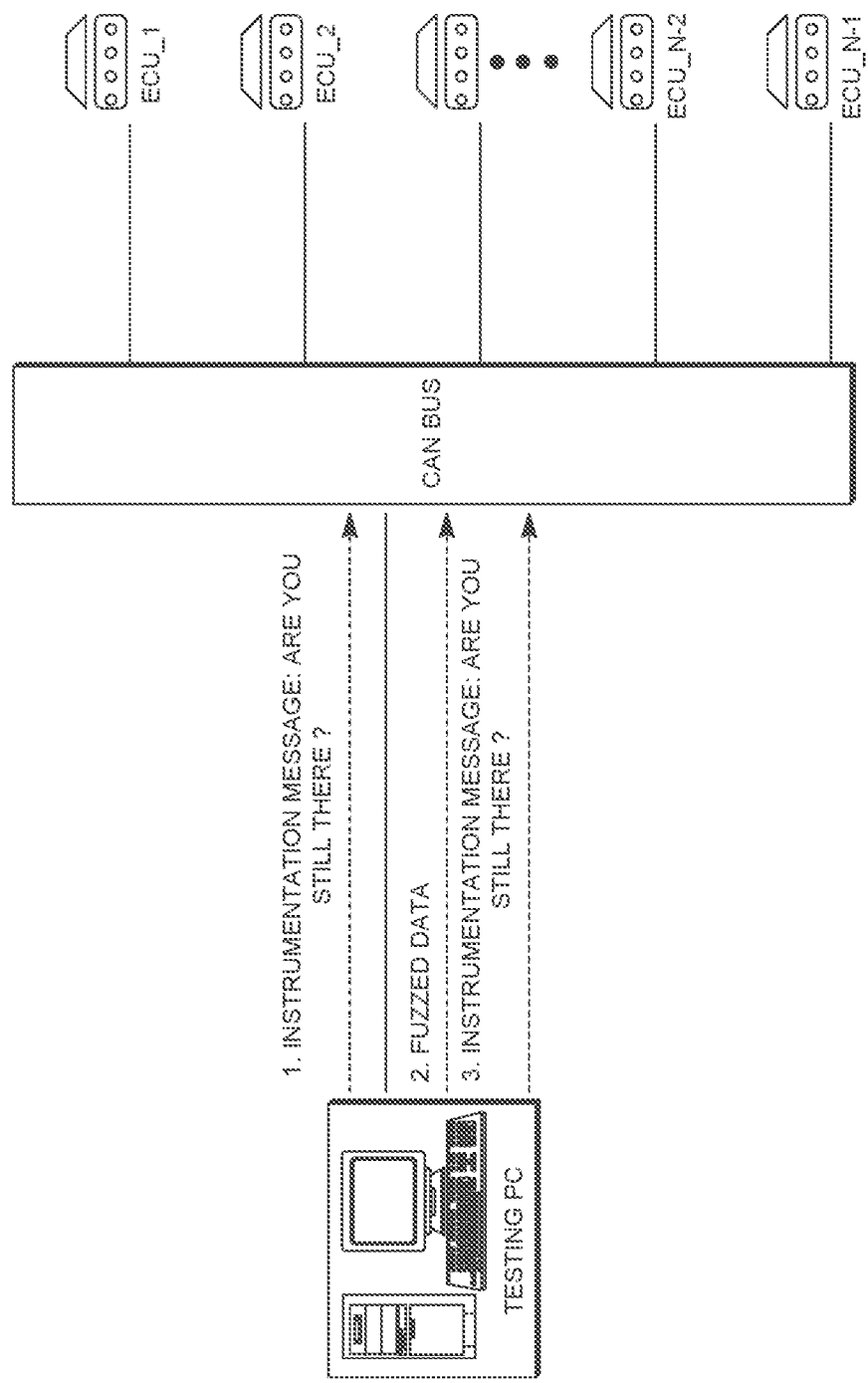
FIG. 6 is an illustrative example of messages sent by the testing device in steps 320, 325, and 330 of the method of FIG. 3 according to one embodiment.

FIG. 6 is a graphical illustration similar to FIG. 4 that illustrates steps 320, 325, and 330 of the method 300.

Figure 7:
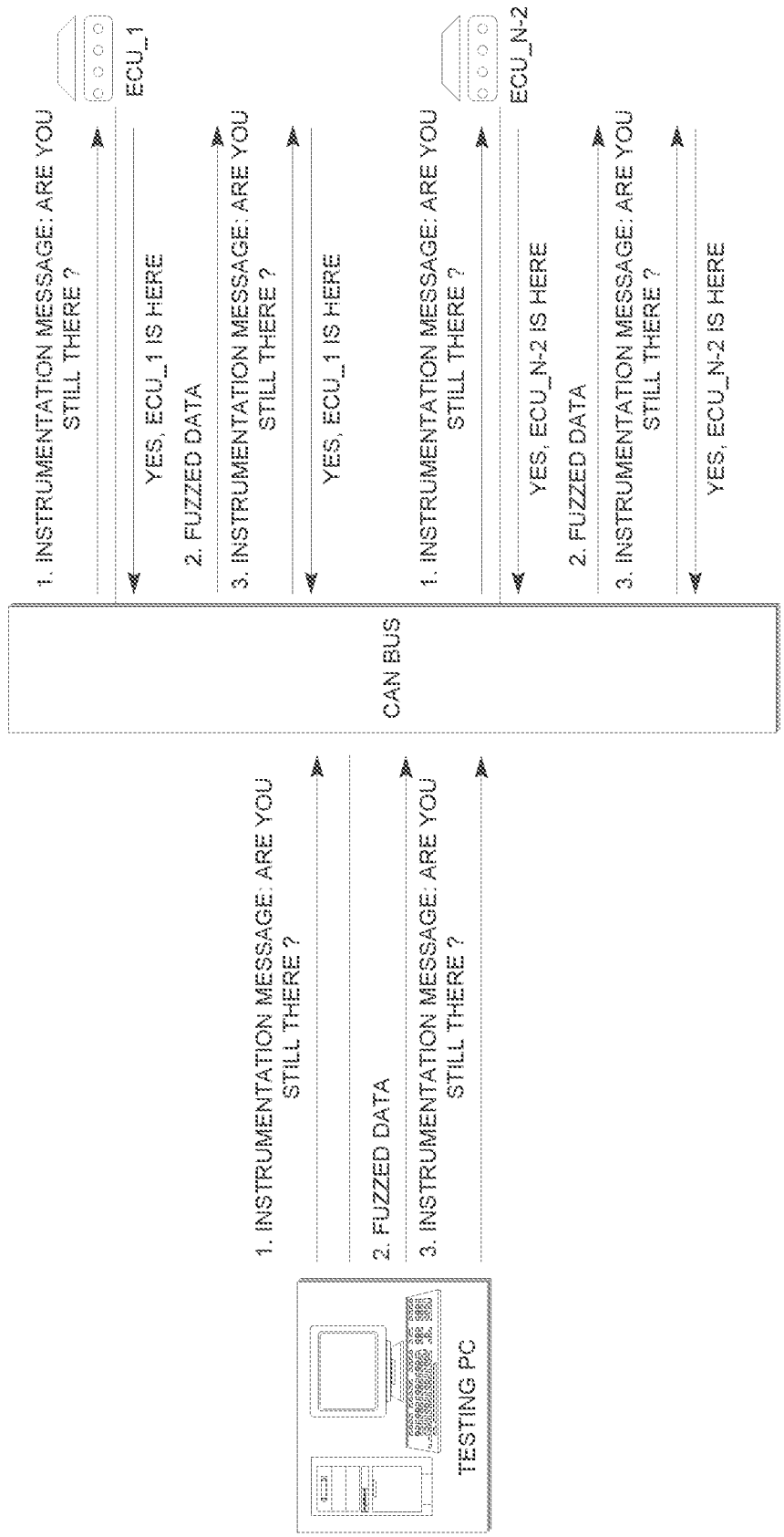
FIG. 7 is an illustrative example of the messages sent by the testing device in steps 320, 325, and 330 of the method of FIG. 3 and the responses the testing device receives when the electronic devices correctly handle an exception according to one embodiment.

FIG. 7 is a graphical illustration that is similar to FIG. 6. FIG. 7 illustrates steps 320, 325, and 330 of the method 300 when each of the selected electronic devices respond with a valid response to the first status query message and second status query message.

Figure 8:
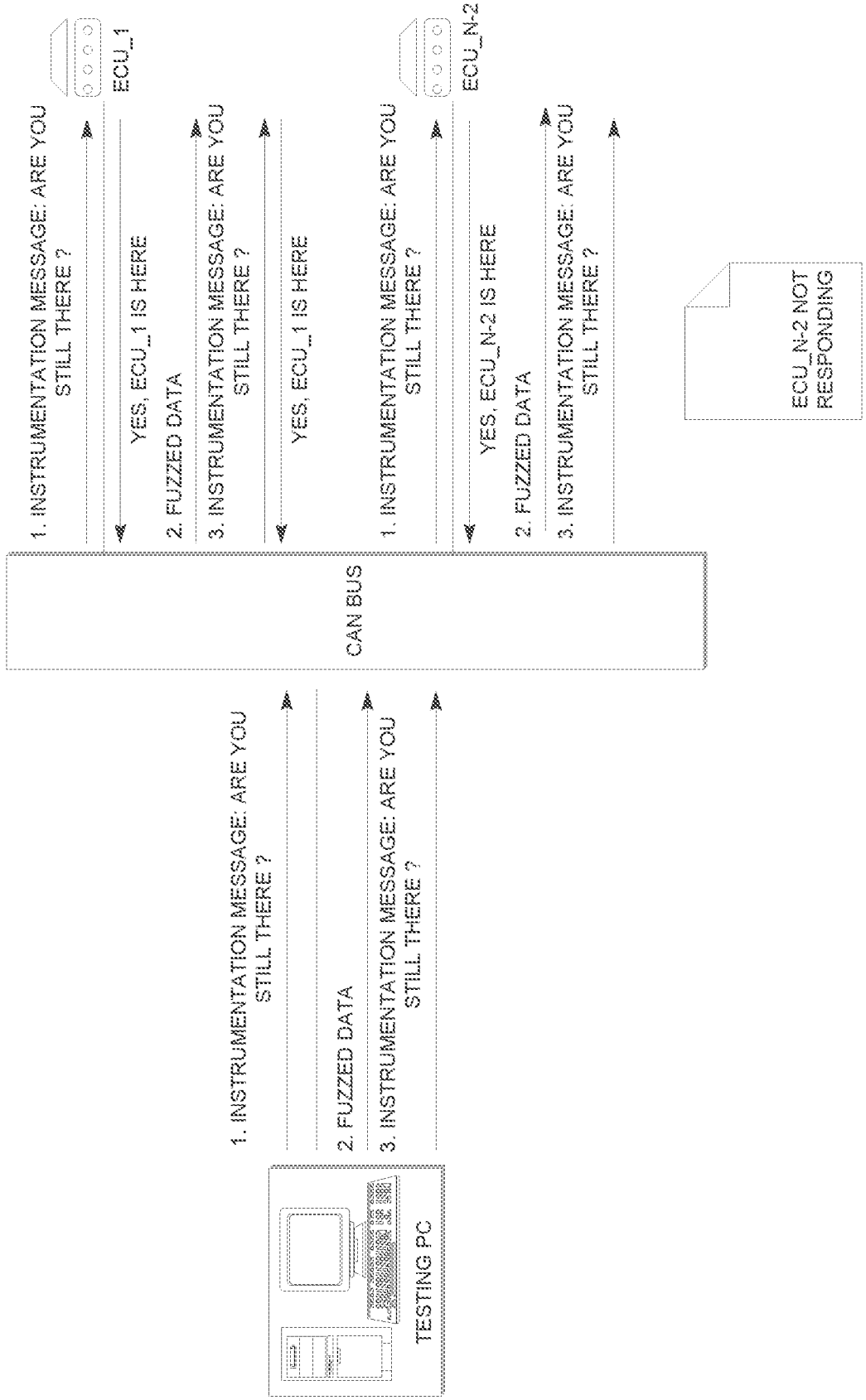
FIG. 8 is an illustrative example of messages sent by the testing device in steps 320, 325, and 330 of the method of FIG. 3 and the responses the testing device receives when one electronic device does not correctly handle an exception according to one embodiment.

FIG. 8 is a graphical illustration that is similar to FIG. 7. FIG. 8 illustrates steps 320, 325, and 330 of the method 300 when each of the selected electronic devices respond with a valid response to the first status query message but the electronic device ECU_n−2 does not respond to the second status query message.

Thus, the embodiments described herein provide, among other things, a system and a method for simultaneously testing whether a plurality of electronic devices connected via a communication network correctly handle exceptions. Various features and advantages of the embodiments are set forth in the following claims.

What is claimed is:

1. A system for simultaneously testing whether a plurality of electronic devices connected via a communication network correctly handle exceptions, the system comprising:
    a communication network; and
    a plurality of electronic devices and a testing device connected via the communication network, the testing device comprising:
    an electronic processor configured to:
        send a first status query message to the plurality of electronic devices, via the communication network;
        send fuzzed data to the plurality of electronic devices, via the communication network;
        send a second status query message to the plurality of the electronic devices, via the communication network; and
        for each electronic device of the plurality of electronic devices that responds to the first status query message with a valid response and responds to the second status query message with an invalid response or fails to respond to the second status query message, record the electronic device in a failure log.

2. The system according to claim 1, wherein a header of the first status query message and a header of the second status query message include a global identifier.

3. The system of claim 1, wherein the electronic processor is configured to send fuzzed data to the plurality of electronic devices, via the communication network by:
    sending a first message, via the communication network, to the plurality of electronic devices;
    for each electronic device that responds to the first message, recording the electronic device in a log of electronic devices available for testing;
    receiving a selection of electronic devices from the log of electronic devices available for testing; and
    sending fuzzed data to the selected electronic devices, via the communication network.

4. The system of claim 3, wherein the electronic processor is configured to:
    for each selected electronic device that responds to the first status query message with a valid response and responds to the second status query message with an invalid response or fails to respond to the second status query message, record the selected electronic device in the failure log.

5. The system according to claim 1, wherein the electronic processor is further configured to
    send a third status query message to each electronic device recorded in the failure log a predetermined amount of time after sending the second status query message; and
    send a message to an electronic device to power cycle the electronic device, when the electronic device recorded in the failure log does not respond to the third status query message or replies with an invalid response.

6. The system according to claim 1, wherein the electronic processor is further configured to
    receive revised computer executable instructions configured to prevent an electronic device recorded in the failure log from malfunctioning when the electronic device receives data similar to the fuzzed data; and
    send the revised computer executable instructions to the electronic device recorded in the failure log, wherein the electronic device recorded in the failure log replaces computer executable instructions that were previously stored in its memory with the revised computer executable instructions.

7. The system according to claim 1, wherein the fuzzed data is configured to cause an electronic device to malfunction.

8. The system according to claim 1, wherein the electronic processor is further configured to:
    receive a file;
    parse the file to determine, for each of the plurality of electronic devices, a valid message the electronic device is configured to receive; and
    alter the valid message to create the fuzzed data.

9. A method of simultaneously testing whether a plurality of electronic devices connected via a communication network correctly handle exceptions, the method comprising:
    sending, with an electronic processor, a first status query message to a plurality of electronic devices via a communication network;
    sending, with the electronic processor, fuzzed data to the plurality of electronic devices, via the communication network;
    sending, with the electronic processor, a second status query message to the plurality of electronic devices, via the communication network; and
    for each electronic device of the plurality of electronic devices that responds to the first status query message with a valid response and responds to the second status query message with an invalid response or fails to respond to the second status query message, recording the electronic device in a failure log.

10. The method according to claim 9, wherein a header of the first status query message and a header of the second status query message include a global identifier.

11. The method according to claim 9, wherein sending, with the electronic processor, fuzzed data to the plurality of electronic devices includes:
    sending a first message, via the communication network, to the plurality of electronic devices;
    for each electronic device that responds to the first message, recording the electronic device in a log of electronic devices available for testing; receiving a selection of electronic devices from the log of electronic devices available for testing; and sending fuzzed data to the selected electronic devices, via the communication network.

12. The method according to claim 11, the method further comprising, for each selected electronic device that responds to the first status query message with a valid response and responds to the second status query message with an invalid response or fails to respond to the second status query message, recording the selected electronic device in the failure log.

13. The method according to claim 9, the method further comprising:

sending a third status query message to each electronic device recorded in the failure log; and sending, to each electronic device recorded in the failure log that does not respond to the third status query message or replies with an invalid response, a message to power cycle the electronic device.

14. The method according to claim 9, the method further comprising:

receiving revised computer executable instructions configured to prevent an electronic device recorded in the failure log from malfunctioning when the electronic device receives data similar to the fuzzed data; and sending the revised computer executable instructions to the electronic device recorded in the failure log, wherein the electronic device recorded in the failure log replaces computer executable instructions that were previously stored in its memory with the revised computer executable instructions.

15. The method according to claim 9, wherein the fuzzed data is configured to cause an electronic device to malfunction.

16. The method according to claim 9, the method further comprising:

receiving a file;

parsing the file to determine, for each of the plurality of electronic devices, a valid message the electronic device is configured to receive; and altering the valid message to create the fuzzed data.

* * * * *